United States Patent [19]
Wiesener et al.

[11] Patent Number: 5,987,811
[45] Date of Patent: Nov. 23, 1999

[54] DEVICE FOR THE FIXING OF BAIT STATIONS AT GROUND LEVEL

[76] Inventors: Mark Wiesener; Bernd Wiesener, both of Hauptstrasse 11a, D - 16567 Mühlenbeck, Germany

[21] Appl. No.: 09/126,245

[22] Filed: Jul. 30, 1998

[51] Int. Cl.[6] .................................................. A01M 25/00
[52] U.S. Cl. ............................... 43/131; 43/58; 43/96
[58] Field of Search .................................. 43/58, 60, 61, 43/96, 131; 114/295, 294; 52/160, 162, 164

[56] References Cited

U.S. PATENT DOCUMENTS

| | | | |
|---|---|---|---|
| 631,168 | 8/1899 | Langston | 114/295 |
| 677,839 | 7/1901 | Young | 114/294 |
| 691,335 | 1/1902 | Carlgren | 43/96 |
| 769,083 | 8/1904 | Hick | 52/162 |
| 789,990 | 5/1905 | Miller | 52/162 |
| 817,044 | 4/1906 | Cissna | 52/160 |
| 836,678 | 11/1906 | Gallagher | 52/164 |
| 915,784 | 3/1909 | Miller | 52/162 |
| 1,309,036 | 7/1919 | Knight | 43/96 |
| 1,366,282 | 1/1921 | Ropp | 43/61 |
| 1,368,813 | 2/1921 | Lazenby | 43/96 |
| 1,369,750 | 2/1921 | Lazenby | 43/96 |
| 1,389,884 | 9/1921 | Lazenby | 43/92 |
| 1,454,015 | 5/1923 | Schuetz | 43/96 |
| 1,560,451 | 11/1925 | Weyrick | 114/294 |
| 1,731,785 | 10/1929 | Mansell | 114/294 |
| 1,819,762 | 8/1931 | Birkenmaier | 52/160 |
| 1,877,979 | 9/1932 | Savage | 43/131 |
| 1,952,963 | 12/1934 | Post | 52/162 |
| 1,960,464 | 5/1934 | Thalheimer | 43/131 |
| 2,058,751 | 10/1936 | Woolfrey | 43/96 |
| 2,243,886 | 6/1941 | Scott | 52/160 |
| 2,513,130 | 6/1950 | Arnest | 43/96 |
| 2,520,233 | 8/1950 | Buehl | 114/294 |
| 2,527,629 | 10/1950 | Free | 43/96 |
| 2,556,279 | 6/1951 | Johnson | 114/294 |
| 2,570,646 | 10/1951 | Cole | 52/160 |
| 2,644,266 | 7/1953 | Updegrove | 114/294 |
| 2,736,127 | 2/1956 | McCann | 43/131 |
| 2,918,748 | 12/1959 | Oesch | 43/96 |
| 2,941,636 | 6/1960 | Cordes | 52/164 |
| 3,488,879 | 1/1970 | Laughlin | 43/131 |
| 3,601,941 | 8/1971 | Watanabe et al. | 52/162 |
| 3,653,167 | 4/1972 | Menard | 52/162 |
| 3,772,820 | 11/1973 | Bond | 43/131 |
| 3,978,607 | 9/1976 | Piere | 43/131 |
| 4,158,929 | 6/1979 | Custard | 43/58 |
| 4,173,938 | 11/1979 | Colin | 114/294 |
| 4,208,829 | 6/1980 | Manning | 43/131 |
| 4,224,892 | 9/1980 | Sandberg | 114/294 |
| 4,226,042 | 10/1980 | Gilbert | 43/96 |
| 4,277,907 | 7/1981 | Ernest | 43/131 |
| 4,308,683 | 1/1982 | Lee | 43/96 |
| 4,329,805 | 5/1982 | Novak | 43/96 |
| 4,483,093 | 11/1984 | Isborn | 43/58 |
| 4,633,610 | 1/1987 | Thompson | 43/61 |
| 4,660,320 | 4/1987 | Baker et al. | 43/131 |
| 4,708,086 | 11/1987 | Brown, Jr. | 114/294 |
| 4,748,766 | 6/1988 | Stimac | 43/69 |
| 4,802,301 | 2/1989 | Isborn et al. | 43/58 |
| 5,038,516 | 8/1991 | Doucette | 43/131 |
| 5,272,832 | 12/1993 | Marshall et al. | 43/131 |
| 5,446,992 | 9/1995 | Stewart | 43/131 |
| 5,743,207 | 4/1998 | Al-Sabah | 114/294 |
| 5,775,848 | 7/1998 | Blankinship et al. | 52/160 |
| 5,868,094 | 2/1999 | Al-Sabah | 114/294 |

*Primary Examiner*—Michael J. Carone
*Assistant Examiner*—Darren W. Ark
*Attorney, Agent, or Firm*—Notaro & Michalos P.C.

[57] ABSTRACT

A device fixed to the ground, bait stations such as bait boxes for rats. Such bait boxes which are secured against undesired opening are anchored flush to the ground in such a manner that the unauthorized moving of the bait box is practically excluded. For this purpose at least one movable wedge-like ground-anchor, connected to a tension element is driven into the ground. The opposite end of the tension element is led through an assigned opening at the bottom of the bait box into the bait box. From the interior of the bait box, an authorized person can pull the tension element to move the ground-anchor into an anchoring position and hold the bait box flush with its bottom to the ground, whereby the anchoring of the bait box can be removed only after its authorized re-opening.

6 Claims, 1 Drawing Sheet

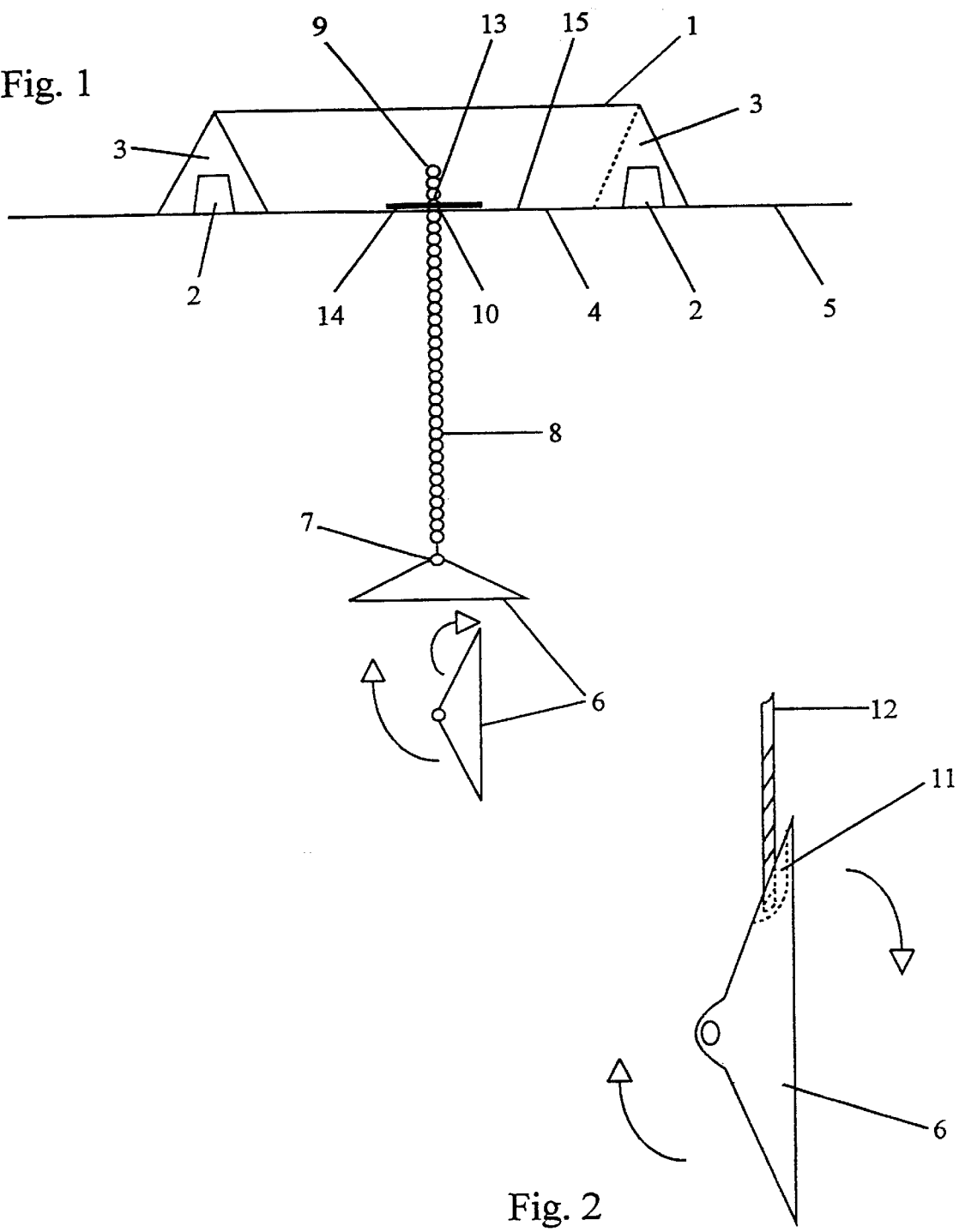

DEVICE FOR THE FIXING OF BAIT STATIONS AT GROUND LEVEL

FIELD AND BACKGROUND OF THE INVENTION

The present invention relates to a device to fix bait stations to the ground especially bait boxes for rats which are secured against undesired opening with fixing elements which can be attached to the bait box and driven into the soil to hold the bait box to the ground.

In connection with the fighting of rodents like rats by means of rat poisons outdoors as e.g. in parks, sport grounds, on children's playgrounds and in dike-areas, the public and concerned lawmakers in many states, but especially in the United States of America and in Great-Britain, increasingly ask pest controllers to practically exclude a possible danger through poisoning by the laying of bait in so-called safety boxes of plastic or metal. But the laying of baits in such safety boxes is also insufficient to meet the higher safety requirements if the bait boxes, when inadequately anchored, are wilfully torn off and bait can be shaken out of them. At the same time there is a high risk for pest controllers that the relatively expensive safety boxes are stolen.

SUMMARY OF THE INVENTION

The present invention is therefore based on the need to provide a device of the type mentioned above which guarantees in a flexible manner a bait box for different types of soil, practically flush with the ground, which is not removable by unauthorized persons, whereby the risk of being stolen—apart from the application of brute force—will be minimized.

According to the invention, this task is solved by at least one movable, or wedge-shaped ground-anchor at which one end of a tension element is fastened, the other end of which is, after having driven the ground-anchor into the ground, led through one assigned opening provided in the bottom of the bait box into this bait box and which is fixable on the interior surface of the bottom in the authorized opened bait box in such a tensioned manner, that the movable ground-anchor in the tensioned position of the tension element is in a position which is vertical to the position it had when it was driven into the ground and parallel to the bottom of the bait box, and that the bait box is held anchored with its bottom flush to the ground, whereas the anchoring of the bait box is removable only after its authorized re-opening.

The device according to the invention uses in a surprisingly effective manner the principle of a common wedge-drop-anchor or ceiling dowel for the manipulation-safe anchoring of bait boxes especially for rats also in lose ground, which can be removed and adjusted only after re-opening of the bait box by the pest controller or an authorized technician. Any undesired shaking out of the bait from the bait box is thus prevented and the increased safety requirements with regard to the fighting of rodents are satisfactorily met. At the same time the theft-risk to the installer of the relatively expensive safety box is considerably reduced. The invention provides a simple, safe, and flexible fixing means for an outdoor bait station which makes it possible only for the pest controller and/or technician to remove the bait station and/or the bait. It is also of advantage that the anchoring technique of the device according to the invention is not visible from the outside because the special fixing of the end of the tension element extending into the bait box which may also run out of the box in the form of a rope loop, cannot be seen on the interior surface of the bottom of the bait box in its locked condition.

BRIEF DESCRIPTION OF THE DRAWINGS

In the drawings:

FIG. 1 is a graphic presentation of a bait box anchored to the ground, whereby the tension element of the device to fix the bait box is formed by a chain fixed to the ground-anchor and the ground-anchor is shown both in its position when driven into the ground as well as in its anchored position; and FIG. 2 is a graphic presentation of the movable wedge-like ground-anchor in its drive-in-position with the use of a pushing bolt.

DESCRIPTION OF THE PREFERRED EMBODIMENT

Referring to FIG. 1 a tent-shaped bait box 1 is schematically shown with access openings 2 at its faces 3 for rodents to be caught. The bait box 1 can be made of plastic or metal and has to be equipped with a special locking mechanism (not shown) which can be opened only by skilled personnel to gain access to the interior of bait box 1. Bait box 1 is anchored flush with the ground 5 by means a device to fix bait box 1. The device to fix the bait box 1 has at least one movable, wedge-like or wedge-shaped ground-anchor 6, at which one end 7 of a tension element 8 is fixed, which is preferrably formed as chain as shown by FIG. 1. The other end 9 of the tension element 8 extends into the bait box 1 through an assigned opening 10 provided in the bottom 4 of bait box 1.

Of course two or more tension elements 8 each with ground-anchors 6 and spaced openings 10 in the bottom 4 of the bait box 1 might be provided.

The wedge-like ground-anchor 6 which is shown in FIG. 2 and in FIG. 1 in the lower presentation in its drive-in-position has an admission area or recess 11 for the application of a fixing or pushing bolt 12 (FIG. 2). The ground-anchor 6 is driven with the fixing bolt or member 12 as deep into the loose ground 5 as desired and is thus brought into the vertical position shown at the bottom of FIG. 1. Pulling tension is applied to the anchor 6 at the end 9 of the chain 8 extending through the opening 10 in bottom 4 of the bait box in vertical direction to the ground. This turn the ground-anchor 6 clock-wise around its center of weight into the horizontal anchoring position shown above the vertical position of anchor 6 in FIG. 1. During the simultaneous tensioning process of chain 8, a safety bolt or lock 14 through which chain 8 is pulled, receives a chain link 13 located directly at the assigned opening 10 in the interior of the bait box 1 in such a manner that the chain is box 1 lies on the interior surface 15 of the bottom 4 of the bait box 1. Bolt 14 rigidly tensions the chain 8 at link 13 on the interior surface 15 that it is flush with the bottom 4 of the bait box 1 and the ground 5. After closing the bait box 1 with the safety locking mechanism, the anchoring system of the bait box 1 is not visible from outside, and the unfastening of the anchoring of the bait box 1 and/or the taking out of the bait is possible only after the authorized re-opening of the bait box 1.

As shown in FIG. 2, anchor 6 has a wedge-shaped end that faces downwardly when the anchor is in the vertical drive-in position, so that it can be driven into loose ground by member 12 engaged in recess 11. Lower end 7 of chain 8 is connected near the center of anchor 6 as shown in FIG. 1 so that anchor 6 rotates when it is pulled up by chain 8. Instead of chain 8, the tension element may be a steel or plastic rope that does not stretch or a plastic chain that does not stretch.

What is claimed is:

1. In a bait station having wall means defining an interior with at least one access opening in the wall means for allowing rodents to enter the station, and a bottom having at least one assigned opening therethrough, the bottom having a bottom surface, the improvement comprising;

a ground-anchor having a wedge-shaped end for being driven into ground on which the bottom surface of the bait station is to lie flush, the ground anchor having an opposite end with a recess in the opposite end, the recess being adapted to receive a pushing member for driving the ground-anchor into the ground when the ground anchor is in a substantially vertical drive-in position, the ground anchor having a center;

a tension element having a first end connected to the center of the ground anchor and an opposite second end extending through the at least one assigned opening in the bottom of the bait station, the second end extending into the interior of the bait station; and a safety lock engaged at the bottom of the bait station adjacent the at least one assigned opening for locking a portion of the tension element to the bottom of the bait station at the at least one assigned opening after the tension element has been pulled to rotate the ground anchor from its drive-in position to a substantially horizontal anchoring position in the ground.

2. The improvement according to claim 1 wherein the pushing member comprises a fixing bolt for engaging into the recess of the ground anchor.

3. The improvement of claim 1 wherein the tension element comprises a chain, the safety lock comprising a safety bolt for engaging a link of the chain.

4. In a bait station having wall means defining an interior with at least one access opening in the wall means for allowing rodents to enter the station, and a bottom having at least one assigned opening therethrough, the bottom having a bottom surface, the improvement comprising;

a ground-anchor having a wedge-shaped end for being driven into ground on which the bottom surface of the bait station is to lie flush, the ground anchor having an opposite end with a recess in the opposite end, the recess being adapted to receive a pushing member for driving the ground-anchor into the ground when the ground anchor is in a substantially vertical drive-in position, the ground anchor having a center;

a tension element having a first end connected to the center of the ground anchor and an opposite second end extending through the at least one assigned opening in the bottom of the bait station, the second end extending into the interior of the bait station;

a safety lock engaged at the bottom of the bait station adjacent the at least one assigned opening for locking a portion of the tension element to the bottom of the bait station at the at least one assigned opening after the tension element has been pulled to rotate the ground anchor from its drive-in position to a substantially horizontal anchoring position in the ground; and the tension element comprising a chain with said second end extending through the at least one assigned opening, said safety lock comprising a safety bolt for receiving the chain and for engaging one link of the chain to lock the second end of the chain with respect to the bottom of the bait station when the chain has been pulled to move the ground anchor into its substantially horizontal anchoring position.

5. The improvement according to claim 4 wherein the chain comprises a plastic chain that does not stretch.

6. The improvement of claim 5 wherein the pushing member comprises a fixing bolt for engagement into the recess of the ground anchor.

* * * * *